United States Patent

[11] 3,563,317

| [72] | Inventor | Kenneth F. Sprick |
| | | Zumbro Falls, Minn. 55991 |
| [21] | Appl. No. | 668,776 |
| [22] | Filed | Sept. 19, 1967 |
| [45] | Patented | Feb. 16, 1971 |

[54] PLOW WITH OFFSET CUTTING BLADES
1 Claim, 6 Drawing Figs.

[52] U.S. Cl. ........................................ 172/754;
  37/98; 172/772
[51] Int. Cl. ....................................... A01b 15/04
[50] Field of Search ............................... 172/754,
  772, 760, 721, 722, 726, 733; 37/98; 111/83;
  D35/2(2.1)

[56] References Cited
UNITED STATES PATENTS

| 506,710 | 10/1893 | Mitchell et al. | 172/756 |
| 1,023,771 | 4/1912 | Stone | 172/756 |
| 1,139,840 | 5/1915 | Boyer | 172/760 |
| 2,299,381 | 10/1942 | Collins | 172/754 |
| 391,116 | 10/1888 | Cann | 172/772 |
| 2,154,973 | 4/1939 | Chibnik | 172/754 |

FOREIGN PATENTS

| 981,001 | 1/1965 | Great Britain | 172/761 |
| 68,306 | 10/1913 | Austria | 172/760 |

*Primary Examiner*—Robert E. Pulfrey
*Assistant Examiner*—C. Coughenour
*Attorney*—Williamson, Palmatier & Bains

ABSTRACT: A plow including a moldboard having a pair of plow blades secured to said moldboard and being disposed in forwardly converging angular relation with respect to each other. The reaction forces produced during the plowing operation by said plow blades being directed generally rearwardly and thereby eliminating all draft forces.

PATENTED FEB 16 1971 3,563,317

INVENTOR.
KENNETH F. SPRICK
BY
Williamson, Palmatier
& Bains ATTORNEYS

PLOW WITH OFFSET CUTTING BLADES

An object of this invention is to provide a novel plow, of simple and inexpensive construction, including a moldboard having a pair of plow blades secured thereto which are angularly disposed with respect to each other so that opposed and balanced draft forces are produced as the plow is pulled through the soil.

Another object of this invention is to provide a novel and improved plow including a moldboard having a paid of forwardly converging generally angularly disposed plow blades secured thereto and which cooperate with each other and with said moldboard for effective tillage of the soil while permitting efficient use of the forward draft force applied to the plow by a prime mover, such as a tractor or the like.

These and other objects and advantages of this invention will more fully appear from the following description made in connection with the accompanying drawings wherein like reference characters refer to the same or similar parts throughout the several views, and in which.

Figure 1:
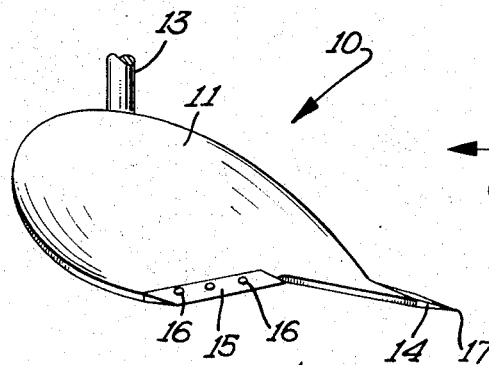
FIG. 1 is a side elevational view of one embodiment of my novel plow.
Figure 2:
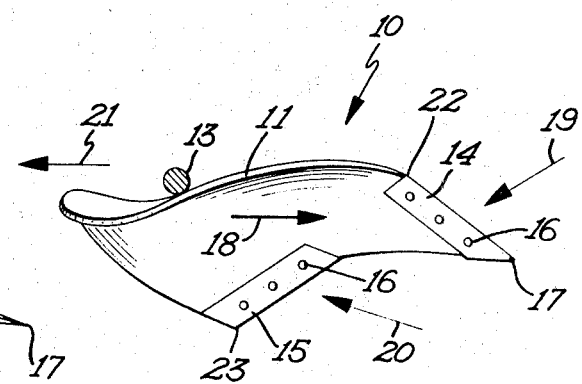
FIG. 2 is s top plan view thereof.

Referring now to the drawings and more specifically to FIGS. 1 and 2, it will be seen that one embodiment of the novel plow, designated generally by the reference numeral 10 is there shown. This plow 10 includes a moldboard 11 constructed of suitable rigid metallic material and to which is secured the standard 13 by any suitable securing means such as bolts, or the like.

The moldboard is of generally conventional construction and configuration and functions to turn the soil in a well-known manner. The plow also includes a pair of angularly disposed generally forwardly converging plow blades 14 and 15, each being detachably secured to the moldboard by suitable bolts 16 to permit replacement of these plow blades. It will be noted that blade 14 is disposed forwardly of and spaced forwardly and outwardly. It will also be noted that the plow blade 14 terminates in a forwardly projecting point 17.

When the plow 10 is pulled through the soil, the forward draft acting on the plow is represented directionally by the arrow 18. The reaction draft force acting on blade 14 is represented directionally by the arrow 19 while the reaction draft force acting against the plow blade 15 is directionally indicated by the arrow designated 20. It will be noted that the direction of the forces 19 and 20, while not being disposed in directly opposed relationship to each other, do converge angularly in a rearward direction. The general direction of the resultant force or vector 19 and 20 is represented generally by the arrow 21, and it will be noted that this force would constitute directionally the reaction force to the draft force 18.

It will be appreciated that in conventional plows, the plow blade is angularly disposed with respect to the direction of travel of the plow so that a side draft is produced on the plow tending to twist the plow about a generally vertical axis. In these conventional plows, a land side is provided which, of course, engages the side of the furrow being cut and resist this side draft. However, by providing the plow with a pair of blades which are angularly disposed with respect to each other, the draft forces produces by these blades and the associated part of the moldboard balance each other with respect to the respective lateral components of force, so that there is in effect no side draft exerted when the plow is moved through the soil. With this arrangement, the present plow obviates the need of a land side and eliminates the drag which is caused by the side draft in conventional plows.

It will be noted that the rear or outermost edge of the plow blade 14 terminates in point designated by the reference numeral 22, while the outermost marginal portion of the blade 15 is designated by the reference numeral 33. The standard 13 and point 17 are disposed in substantial alignment so that a line passing through them will substantially bisect a line joining point 22 and the point 23. By so disposing the standard and the point 17, it has been found that the draft force 18 is uniformly applied to the plow 10, and further minimizes any twisting effect on the plow. It will be noted that the point 17 extends laterally beyond the inner end of blade 15. Thus, a slight amount of overlap is provided for the effective cutting length of the blades. With this arrangement, the inner end portion of the blade 15 will not cut the soil but move in the cut formed by the point 17. Therefore, this arrangement also minimizes the tendency of the plow to twist.

Figure 3:
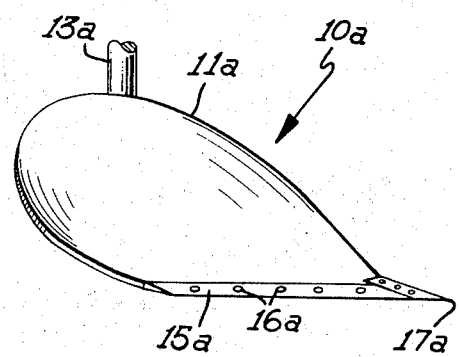
FIG. 3 is a side elevational view of a different embodiment of the plow.

Referring now to FIGS. 2 and 3, it will be seen that a different embodiment of the novel plow designated generally by the reference numeral 10a is there shown and includes a moldboard 11a having a standard 13l secured thereto by any suitable securing means, such as bolts or the like. A pair of blades 14a and 15l are secured to the moldboard by suitable bolts 16l or the like, and it will be noted that the blades converge forwardly towards each other. It will be noted that the blades 14a and 15l present a substantially angularly disposed continuous cutting surface, while the blades 14 and 15 of the embodiment illustrated in FIGS. 1 and 2, are spaced apart and present two separate cutting surfaces rather than a continuous uninterrupted cutting surface. The blade 14a terminates in a point 17a at its forwardmost end and also terminates in a rearward or lateral marginal point 22a. The blade 15a also terminates rearwardly and laterally in a lateral point 23a. The standard 13a and point 17a are disposed in substantial alignment with each other so that a line connecting the point and standard would generally bisect a line joining the marginal points 22a and 23a respectively.

It will be noted that the forward end portion of the blade 14l and especially point 17a projects laterally beyond the front end portion of the blade 15a.

Figure 4:
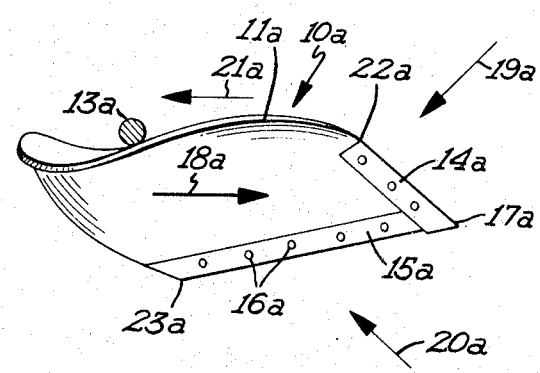
FIG. 4 is a top plan view of the embodiment illustrated in FIG. 3.

The arrow 18a represents the direction of the draft force applied to the plow through the standard 13a during the plowing operation. The arrows 19a and 20a represents the direction of the reaction force acting on each of the blades 14a and 15a, as well as the adjacent moldboard areas during the plowing operation. The arrow 21a represents the direction of the resultant force or vector of the forces 19a and 20a in the manner of the embodiment of FIGS. 1 and 2. It will be seen that the blade 15a converges towards the front portion of the blade 14a and that blade 15a is of substantially greater length than blade 14a. It is also pointed out that the induced angle between blades 14a and 15a is an acute angle. It is also pointed out that if the blades 14 and 15 in the embodiments of FIGS. 1 and 2 were extended into intersecting relation, the included angle therebetween would also be an acute angle. The reaction forces exerted on the plow in the embodiment illustrated in FIGS. 3 and 4 are also balanced so that there is no side draft that tends to turn or twist the plow during the plowing operation.

Figure 5:
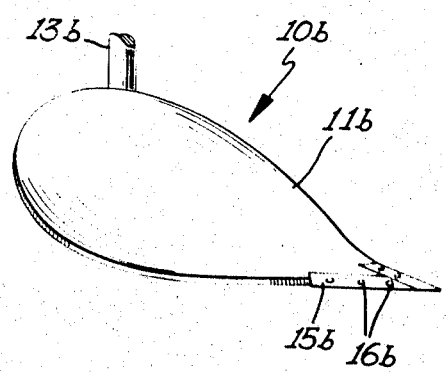
FIG. 5 is a side elevational view of a further embodiment of the novel plow.
Figure 6:
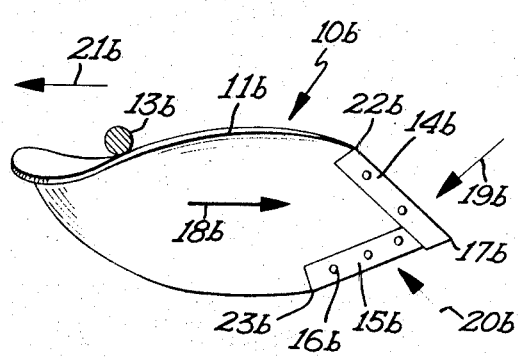
FIG. 6 is a top plan view thereof.

Referring now to FIGS. 5 and 6, it will be seen that a further embodiment of the plow is there shown and is designated generally by the reference numeral 10b. This plow also includes a moldboard 11b having a standard 13b secured thereto and projecting upwardly therefrom. The moldboard 11b has a pair of angularly disposed forwardly converging plow blades 14b and 15b secured thereto by suitable bolts 16b. These plow blades are detachable from the plow in a well-known manner. It will be noted that the blades 14b and 15b are of substantially the same size and are disposed in engaging relation with respect to each other, so that the included angle therebetween is an acute angle. The blade 14b terminates forwardly in a point 17b and terminates rearwardly in a point 22b. The blade 15b terminates rearwardly in a point 23b. The point 17b and standard 13b are disposed in substantial alignment and generally bisect a line joining points 22b and 23b in the manner of the previously described embodiments. Again, it will be noted that the forward end portion of the blade 14b and especially the point 17b projects laterally beyond the forward end portion of the blade 15b.

The draft force which pulls the plow 10b through the soil is represented by the arrow 18b while the respective reaction forces acting on blades 14b and 15b are represented respectively by the arrows 19b and 20b. The resultant vector or force of the angularly disposed forces 19b and 20b is represented by the arrow 21b which, as shown, is generally oppositely directed with respect to the draft force 18b. The embodiment of the plow illustrated in FIGS. 5 and 6 is similar to the embodiment of FIGS. 3 and 4 in that the blades 14b and 15b define substantially continuous cutting edge. However, the blades 14b and 15b are of substantially the same size in the manner of the embodiment of FIG. 1. The side draft force acting on the blades 14b and 15b respectively, and the adjacent portion to the moldboards, are in a substantially balanced condition thus eliminating the side draft effect and obviating the need of a land side.

From the foregoing description, it will be seen that by providing a pair of plow blades disposed generally in angulated relation with respect to each other and arranged in generally forwardly converging relation, the normal attendant side draft forces which act on the plow are substantially eliminated. With this arrangement, the land side may be omitted, or, if desired, a very small land side may be provided. It has been found that plows which incorporate the novel features of this invention may very effectively turn the soil while eliminating the side draft. It is pointed out that this arrangement of the plow shares or blades may be used with conventional moldboards without requiring substantially any modification thereof.

Thus is will be seen from the preceding description that I have provided a plow which is not only of simple and inexpensive construction, but one which functions in a more efficient manner than any heretofore known comparable plow.

It will, of course, be understood that various changes may be made in the form, details, arrangement and proportions of the various parts without departing from the scope of my invention.

I claim:

1. A plow including:
   a continuous imperforate mold board;
   a standard affixed to said moldboard and projecting upwardly therefrom, and being adapted to be connected to an implement frame;
   a pair of elongate plow blades secured to said moldboard and being disposed in forwardly converging angular relation to each other, said blades being of substantially the same length and spaced apart from each other, one of said blades being disposed forwardly of the other, and terminating in a forward point, each of said blades having a substantially straight leading cutting edge disposed in angular relation to the direction of travel, and each blade terminating in a rear point, whereby a line extending between said standard and said front of said one blade will substantially bisect a line extending between the rear points of said blades, said cutting edges being disposed in substantially a single horizontal plane, the forward end portion of one of said blades being disposed laterally beyond the forward edge of the other blade whereby the cutting edges of the blade defines a continuous cutting surface, each of said blades having a substantially straight rear edge secured along its entire length to the moldboard, the upper surface of each blade and the moldboard presenting a continuous surface, said blades cooperating with each other whereby when said plow is pulled through the soil, the resulting force of the reaction forces acting upon said plow blades will be directed substantially rearwardly and in the opposite direction of the draft force pulling the plow through the soil to thereby eliminate side draft on the plow.